Figure 2:
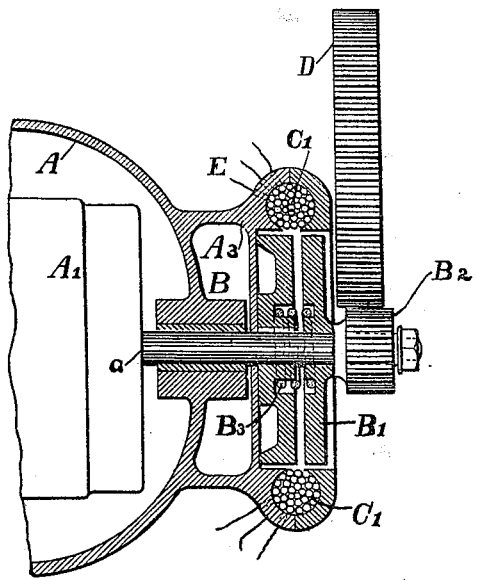

No. 665,321. Patented Jan. 1, 1901.
F. W. GARRETT.
METHOD OF CONTROLLING ELECTRIC MOTORS.
(Application filed Mar. 26, 1900.)
(No Model.) 2 Sheets—Sheet 1.

WITNESSES:
M. E. Sharpe.
B. M. Smith.

INVENTOR
F. W. Garrett,
BY Geo. H. Parmelee,
his ATTORNEY.

No. 665,321. Patented Jan. 1, 1901.
F. W. GARRETT.
METHOD OF CONTROLLING ELECTRIC MOTORS.
(Application filed Mar. 26, 1900.)
(No Model.) 2 Sheets—Sheet 2.

Position X

Position 1

Position 2

Position 3

Position y

Open Circuit

Position 4

Position 5

Position 6

WITNESSES:
M. E. Sharpe
B. M. Smith

INVENTOR
F. W. Garrett
BY
Geo. H. Parmelee,
his ATTORNEY.

UNITED STATES PATENT OFFICE.

FRANK W. GARRETT, OF JOHNSTOWN, PENNSYLVANIA, ASSIGNOR TO THE LORAIN STEEL COMPANY, OF PENNSYLVANIA.

METHOD OF CONTROLLING ELECTRIC MOTORS.

SPECIFICATION forming part of Letters Patent No. 665,321, dated January 1, 1901.

Original application filed August 24, 1899, Serial No. 728,379. Divided and this application filed March 26, 1900. Serial No. 10,152. (No model.)

*To all whom it may concern:*

Be it known that I, FRANK W. GARRETT, of Johnstown, in the county of Cambria and State of Pennsylvania, have invented a new and useful Improvement in Methods of Controlling Electric Motors, of which the following is a full, clear, and exact description, reference being had to the accompanying drawings, which form a part of this specification.

This invention has relation to a novel method of controlling electric motors and the mechanism or mechanisms driven thereby, and is designed to provide a method of control which is economical in point of current consumption, none of the current being wasted by the interposition of useless resistance, which permits a gradual starting and acceleration of the driven mechanism, and which reduces very largely the wear and tear of the driving-gears, the commutators, brushes, and bearings, and also the danger of bursting the armature-bands when running at high speed on downgrades.

The invention consists in a method of controlling a plurality of electric motors by starting them from a position of rest, connected in series with each other and mechanically disconnected from the parts to be driven thereby, then effecting a gradual mechanical connection between the motors and the driven parts and then changing the motors over to parallel relation.

It also consists in the employment of several steps in addition to the above by means of which the circuit is opened and the motors mechanically disconnected from the driven parts preparatory to connecting them in multiple relation, after which the multiple connection is effected and the mechanical connection between the motors and the driven mechanism is gradually restored.

The invention also consists in certain other novel features and combinations thereof, all as hereinafter described, and pointed out in the appended claims.

The invention is applicable to stationary motors, as well as to those employed in propelling moving vehicles, and the magnetic clutch embraced by the invention may be used to advantage in the control of various kinds of machinery.

Figure 1:
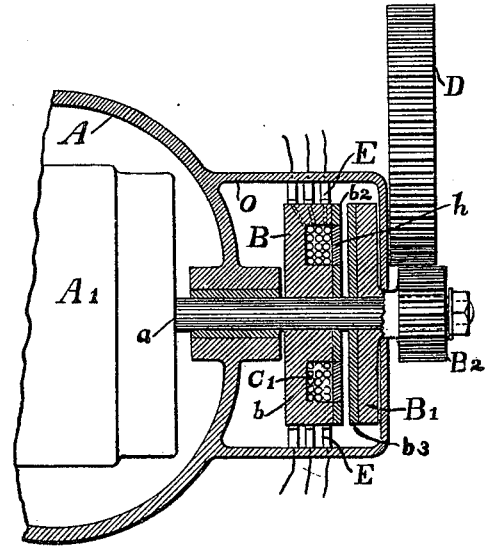
Figure 3:
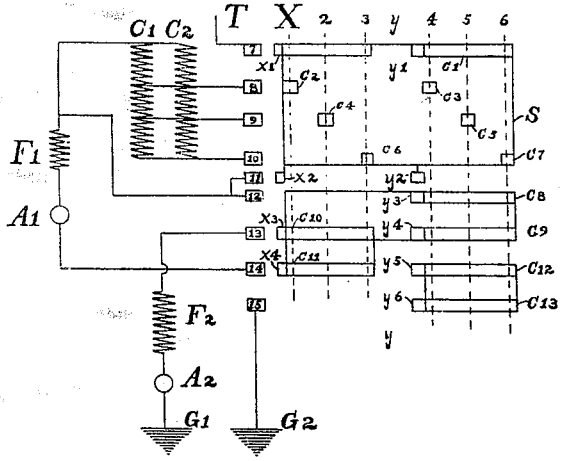
Figure 3:
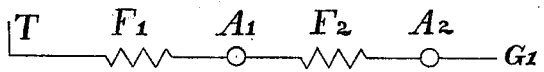
Figure 3:
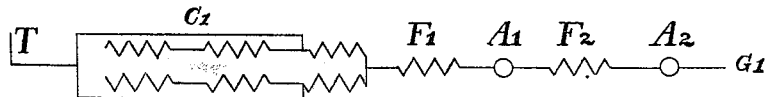
Figure 4:
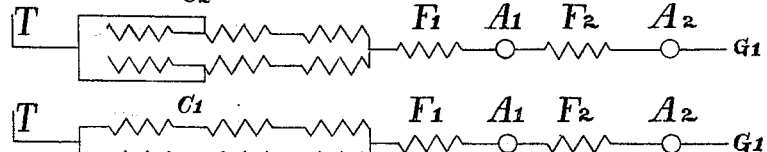
Figure 4:
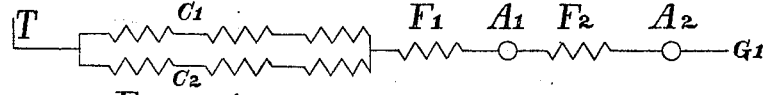
Figure 4:
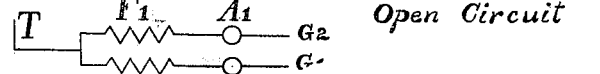
Figure 4:
Figure 4:
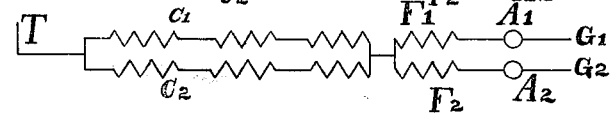

Referring to the accompanying drawings, Figure 1 is a view, partly in section and partly in plan, showing my improved clutch as applied to an electric motor. Fig. 2 is a similar view showing a modified form of clutch. Fig. 3 is a diagrammatic view illustrating the invention applied to the control of two electric motors and showing the clutch and circuit connections. Fig. 4 is a diagrammatic view showing the circuit relations in the several different positions of the switch.

The letter A, Fig. 1, designates a motor frame or casing, A' the armature, and $a$ the armature-shaft, turning in bearings in said frame or casing. B is a clutch-plate fast to said shaft and formed of magnetic material, either iron or steel. B' is a second plate of similar material, loosely mounted on said shaft and carrying a pinion $B^2$, rigid therewith and meshing into a gear-wheel D, forming part of the driven mechanism.

Formed in the inner face of the plate B is an annular groove $b$, in which is seated a magnet-coil C', which is composed of a number of independent sections, any desired number of which may be connected in series through the medium of the switch hereinafter described. In the diagram, Figs. 3 and 4, I have shown this magnet-coil as composed of three sections. E designates brushes which bear upon the rotary clutch-plate B and are electrically connected with contacts of the said switch. One pair of these brushes is provided for each section of the magnet-coil, and each is electrically connected to its corresponding section, as indicated.

$b^2\ b^3$ are renewable wear-plates, of iron or steel, detachably secured in any suitable manner to the inner faces of the respective clutch-plates. The use of these removable plates is advantageous from an economical standpoint; but they are in no way essential to the invention and may be omitted, as shown in Fig. 2.

In Fig. 1 I have shown an oil-box O, in which the clutch turns.

The operation of the clutch will be readily understood. The coil C' being energized magnetizes the clutch-plate B and causes the latter to attract the movable plate B' into contact therewith and effect a driving connection between the armature-shaft and the gear-wheel D. The degree of slippage between the two plates (current strength and lead on the clutch being equal) depends upon the extent to which the coil C' is energized, being comparatively great when but a single section of said coil is in circuit and nil when all the coil-sections are energized.

In the modification shown in Fig. 2 instead of rotating the magnet-coil I inclose same in an extension $A^3$ of the motor frame or casing and surrounding the two clutch-plates, which are thus brought within the field of the coil and act as a core therefor. The tendency of the lines of force composing said field to shorten causes the clutch-plates to be attracted into contact with the fixed plate, and thus establish the driving connection between the armature-shaft and the gear-wheel D, as in the construction first described. $B^3$ designates springs interposed between the two clutch-plates and tending to separate the same.

Referring now to the diagram Fig. 3 the letters $A'$ $A^2$ designate the armatures of a pair of motors, $F'$ $F^2$ the field-coils therefor, and $C'$ $C^2$ the sectional magnet-coils connected in multiple with each other. T designates the connection with one side of the line, and $G'$ a ground connection through one of the armature-shafts. S is the controlling-switch, which is preferably of the well-known rotary type, having a plurality of contacts secured to the periphery of its drum. These contacts are shown as arranged in three groups, all the contacts of each particular group being connected electrically with each other, but disconnected electrically from the contacts of the other groups. In the first group are contacts $c$ to $c^7$, inclusive, in the second group $c^8$ to $c^{11}$, inclusive, and in the third group contacts $c^{12}$ and $c^{13}$. The contacts of the first group control the magnet-coil, those of the second group the series connection of the motors, and those of the third group the parallel connection thereof. In addition to the contacts above described I provide the controller-drum with a line of short contacts $x'$, $x^2$, $x^3$, and $x^4$ on the vertical line X, which are engaged, respectively, by the fingers 7, 11, 13, and 14 before reaching the first-indicated or No. 1 position of the switch. Similar contacts $y'$ to $y^6$, inclusive, are provided on the vertical line Y for engagement with fingers 7, 11, 12, 13, 14, and 15 just before passing to indicated position No. 4. The position in which these contacts $y'$ to $y^6$ are engaged, like the position in which these contacts $x'$ to $x^4$ are engaged, is not indicated on the controller. The purpose of these two sets of contacts will hereinafter appear. Between the position No. 3 and the line of contacts $y'$ $y^6$ point of open circuit. Finger No. 7 is connected to the trolley side of the circuit. Fingers 8, 9, and 10 connect the different sections of the two magnet-coils in parallel and to the motor-circuit. Fingers 11 and 12 are connected to each other and to field-coils $F'$. Finger 13 is connected to field-coil $F^2$ and through said coil and armature $A^2$ to ground. Finger 14 is connected to armature $A'$. Finger 15 is connected to ground $G^2$. Upon the initial movement of the switch fingers 7, 11, 13, and 14 engage the contacts $x'$ $x^2$ $x^3$ $x^4$, and the path of the current is from trolley T to finger 7, contacts $x'$ $x^2$, finger 11, field $F'$, armature $A'$, finger 14, contacts $x^4$ $x^3$, finger 13, field $F^2$, armature $A^2$ to ground $G'$. The magnet-coils are cut out, as will be seen, and the purpose of this position is simply to overcome the inertia of the armatures and start their rotation before actuating the clutches. The position is not indicated to the operator, for the reason that there should be nothing to induce him to stop on this position. Passing to position No. 1 the path of the current is from T to finger 7, contacts $c$ $c^2$, through one section of each magnet-coil in parallel, and then through the two motors in series, as before. In position No. 2 the only change made is that finger 8 loses engagement with contact $c^2$ and finger 9 engages contact $c^4$. This brings into circuit an additional section of each magnet-coil. In position No. 3 finger 9 has left the contact $c^4$ and finger 10 has engaged contact $c^6$. This puts the magnet-coils $C'$ $C^2$ entirely in circuit. Further movement of the switch opens the circuit through the magnet-coils and motors preparatory to passing to multiple. In passing to the first multiple position the fingers 7, 11, 12, 13, 14, and 15 first respectively engage the contacts $y'$, $y^2$, $y^3$, $y^4$, $y^5$, and $y^6$, and the path of the current is from the trolley to finger 7, contacts $y'$ $y^2$, fingers 11 and 12. Here the current divides, one part passing through field $F'$, armature $A'$, finger 14, contacts $y^5$ $y^6$, finger 15 to ground and the other part by contacts $y^3$ $y^4$, finger 13, field $F^2$, armature $A^2$ to ground. This position is not indicated on the controller-index, as it is not desired to have the operator stop on this position. In positions 4, 5, and 6 contacts $c^3$, $c^5$, and $c^7$ operate successively to gradually connect in circuit the sections of the magnet-coils in precisely the same manner as the contacts $c^2$ $c^4$ $c^6$ in positions 1, 2, and 3, and it will not be necessary to again trace out the circuit in detail. The current after passing through the magnet-coils or sections thereof passes through the two motors in parallel by the path traced out in position Y, except that contacts $c^8$, $c^9$, $c^{12}$, and $c^{13}$ take the place of the contacts on the line Y. It will be seen, therefore, that I start the motors momentarily disconnected from the parts to be driven and gradually effect a connection with such parts by gradually increasing the action of the magnetic clutch, the magnet-coils building up in strength as the current passing therethrough increases and as more sections are connected in circuit. I then open the circuit and pass to multiple, repeating the operation of gradually strengthening the action of the clutch.

On downgrades the switch can be thrown to off position, which not only opens the circuit through the motors, but also through the magnet-coils, and thereby releases the clutches. This permits the motors to remain idle and saves the wear of gears at the commutators and bearings and also prevents accidents due to bursting of armature-bands.

It will be readily seen that the greater the load and the larger the current taken by the motors the stronger becomes the action of the clutch, its strength building up as the load increases; also, that when the clutch is free from slippage the counter electromotive force of the motors holds back the current, so that there is no useless waste of current. The gradual manner in which the driving connection is made prevents lurching and jerking of the car-body in starting and reduces largely the strain and shock on the car-body and truck. It should be noted also that inasmuch as no artificial resistance is employed to regulate the strength of the clutch magnet-coils the current passing to the motors is not limited.

I do not wish to limit myself in the employment of my improved method to the particular construction of clutch herein shown and described nor to the use of the particular switch shown, since I may employ any suitable means for regulating the number of effective ampere-turns in the clutch magnet-coils.

The novel means herein described are not claimed herein, as they form the subject-matter of a pending application, Serial No. 728,379, filed August 24, 1899, of which the present application is a division.

Having thus described my invention, what I claim, and desire to protect by Letters Patent, is—

1. The method of controlling a plurality of electric motors which consists in starting them connected in series and mechanically disconnected from the parts to be driven thereby, then effecting a gradual mechanical connection between the motors and the driven parts, then changing the motors over to parallel relation.

2. The method of controlling a plurality of electric motors, which consists in starting them connected in series and mechanically disconnected from the parts to be driven thereby, then effecting a gradual mechanical connection between the motors and the driven parts, then opening the circuit through the motors and disconnecting them from the driven parts, then connecting them in multiple with each other, and finally again gradually connecting them with the driven parts.

3. The method of controlling a plurality of electric motors, which consists in starting them from a position of rest connected in series with each other and mechanically disconnected from the mechanism to be driven thereby, then effecting electromagnetically a gradual mechanical connection between said motors and mechanism, and then shifting the motors over to parallel relation, substantially as described.

4. The method of controlling a plurality of electric motors, which consists in starting them from a position of rest mechanically disconnected from the mechanism to be driven thereby, then effecting gradually a mechanical driving connection between said motors and mechanism, and in conjunction therewith accelerating the speed of the motors by changing them from series to parallel relation, substantially as described.

In testimony whereof I have affixed my signature in presence of two witnesses.

FRANK W. GARRETT.

Witnesses:
MYRTLE E. SHARPE,
H. W. SMITH.